United States Patent [19]
Sano et al.

[11] Patent Number: 5,576,836
[45] Date of Patent: Nov. 19, 1996

[54] MULTI-PICTURE IMAGE PRINTING SYSTEM

[75] Inventors: Homare Sano, Sagamihara; Katsumi Miwa, Machida; Norimasa Kubota, Sakai; Kimitoshi Hori, Takasuki, all of Japan

[73] Assignee: Minolta Co., Ltd., Osaka, Japan

[21] Appl. No.: 331,285

[22] Filed: Oct. 28, 1994

[30] Foreign Application Priority Data

Oct. 29, 1993 [JP] Japan ................................ 5-272403

[51] Int. Cl.$^6$ .............................. H04N 1/21; H04N 1/46; G03B 27/52
[52] U.S. Cl. ........................... 358/302; 358/501; 355/40; 396/322
[58] Field of Search ..................... 358/302, 501; 355/40, 201, 41, 54; 354/110

[56] References Cited

U.S. PATENT DOCUMENTS

| | | | |
|---|---|---|---|
| 4,821,061 | 4/1989 | Gudmundson et al. | 355/40 |
| 4,933,773 | 6/1990 | Shiota | 358/302 |
| 4,962,432 | 10/1990 | Ohtsuka et al. | 358/302 |
| 5,184,227 | 2/1993 | Foley | 358/302 |
| 5,194,892 | 3/1993 | Robison | 355/40 |
| 5,274,418 | 12/1993 | Kazami et al. | 355/40 |
| 5,400,152 | 3/1995 | Manico et al. | 358/501 |
| 5,448,335 | 9/1995 | Ishikawa et al. | 355/40 |

Primary Examiner—Peter S. Wong
Assistant Examiner—Gregory J. Toatley, Jr.
Attorney, Agent, or Firm—Brinks Hofer Gilson & Lione

[57] ABSTRACT

A multi-picture image printing system includes a reception portion for receiving a plurality of recording mediums sequentially, each recording medium carrying a plurality of pictures; a multi-picture image generator operable to read the plurality of pictures recorded on each recording medium and generate a multi-picture image based on the read plurality of pictures; a printer operable to print the generated multi-picture image on a sheet; a medium discharger operable to discharge recording mediums; a sheet discharger operable to discharge printed sheets; a storing unit including a plurality of containers for containing discharged recording medium and printed sheet; and a controllers operable to control the medium discharger, sheet discharger, and the storing unit to place a recording medium and a printed sheet bearing a multi-picture image having pictures recorded on the recording medium in the same container.

17 Claims, 12 Drawing Sheets

MULTI-PICTURE IMAGE PRINTING SYSTEM

BACKGROUND OF THE INVENTION

This invention relates to a multi-picture image printing system in which a film or like recording medium carrying a plurality of recorded pictures is loaded, these pictures are read from the recording medium and printed on a specified sheet.

In recent years, there have been known laboratory systems for hard-copying pictures recorded on a developed film so that these pictures can be used as indices or the like. More specifically, the developed film is loaded in printing apparatus and the photographed pictures are read and printed on a sheet of specified size after being arranged in a specified layout. The printed sheet is kept together with the film, for example, until a depositor comes back to pick them up.

In the existing laboratory systems, the films and the print sheets are handled separately. Considering that pictures recorded on a multitude of films are printed, the films and print sheets may be paired in incorrect correspondence, thereby necessitating the checking of the correspondence. Particularly, since the negative film is returned with being contained in a cartridge, it cannot be looked without a special operation, making it extremely difficult to check the correspondence.

SUMMARY OF THE INVENTION

It is an object of the present invention to provide a multi-picture image printing system which has overcome the problems residing in the prior art.

It is another object of the present invention to provide a multi-picture image printing system which can automatically discharge as a pair a recording medium from which pictures are read and a print sheet on which the pictures are printed after completion of the printing.

The present invention is directed to a multi-picture image printing system comprising: a reception portion for receiving a plurality of recording mediums sequentially, each recording medium carrying a plurality of pictures; a multi-picture image generator operable to read the plurality of pictures recorded on each recording medium and generate a multi-picture image based on the read plurality of pictures; a printer operable to print the generated multi-picture image on a sheet; a medium discharger operable to discharge recording mediums; a sheet discharger operable to discharge printed sheets; a storing unit including a plurality of containers for containing discharged recording medium and printed sheet; and a controllers operable to control the medium discharger, sheet discharger, and the storing unit to place a recording medium and a printed sheet bearing multi-picture image having pictures recorded on the recording medium in the same container.

Also, the present invention is directed to a multi-picture image printing system comprising: a reception portion for receiving a plurality of recording mediums sequentially, each recording medium carrying a plurality of pictures; a multi-picture image generator operable to read the plurality of pictures recorded on each recording medium and generate a multi-picture image based on the read plurality of pictures; a printer operable to print the generated multi-picture image on a sheet; a medium discharger operable to discharge the received recording mediums in a predetermined order; and a sheet discharger operable to discharge a printed sheet corresponding to each recording medium in the same order as the recording mediums.

Further, the present invention is directed to an image processing system comprising: a reception portion for receiving a plurality of roll films sequentially, each roll film carrying a plurality of pictures; a reader operable to read the plurality of pictures recorded on each roll film; a memory operable to store the read pictures; a printer operable to print the read pictures on a sheet; a controller operable to control the printer to print all the picture recorded each roll film on a single sheet; and a film discharger operable to discharge each roll film after placing it in a cartridge case.

According to the invention, upon loading the recording medium including a plurality of recorded pictures, these pictures are first read. Subsequently, a layout suitable for the read pictures is automatically or manually designated and the pictures are printed in this layout on the sheet. The recording medium from which the pictures have been read and the sheet on which the read pictures are printed are discharged as a pair into the same container. The container unit is manually or automatically controlled so that the next container is located at the discharge position each printing operation.

These and other objects, features and advantages of the present invention will become more apparent upon a reading of the following detailed description and accompanying drawings.

DETAILED DESCRIPTION OF THE PREFERRED EMBODIMENTS OF THE INVENTION

A preferred multi-picture image printing system of the present invention will be described with reference to the accompanying drawings.

Figure 1:
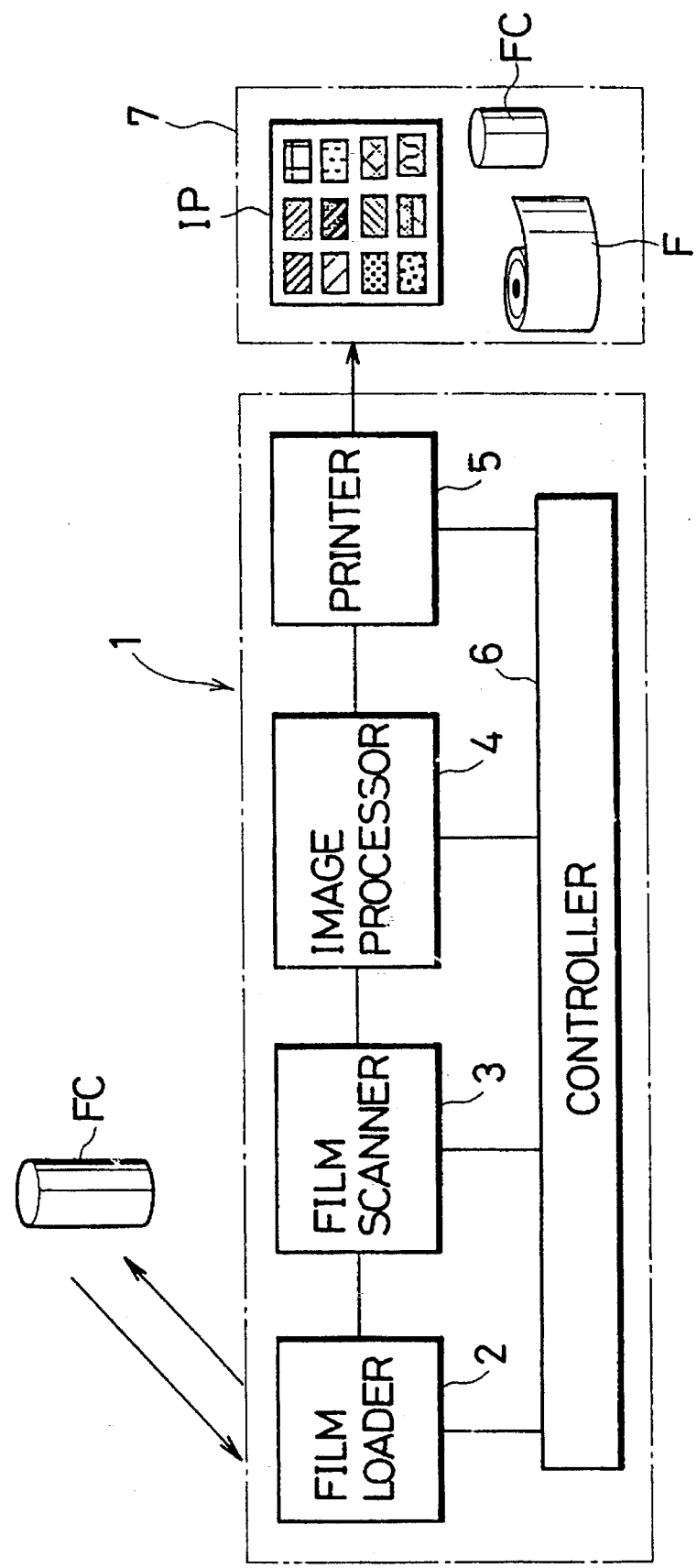
FIG. 1 is a concept diagram showing a basic construction of a multi-picture image printing system embodying the present invention.

FIG. 1 is a concept diagram showing a basic construction of the multi-picture image printing system. This system mainly comprises a printing apparatus 1 and a storing unit 7 connected to the printing apparatus 1.

Indicated at FC is a film cartridge in which a developed film as a recording medium is loaded, at F is a film in a rolled state (hereinafter referred to as a roll film), and at IP a print sheet on which pictures are hard-copied in a specified layout.

The printing apparatus 1 is provided with a film loader 2, a film scanner 3, an image processor 4, a printer 5 and a controller 6. The film loader 2 loads and discharges the film cartridge FC containing the roll film F or directly loads and discharges the roll film F itself without mounting it in a cartridge or cassette. The film scanner 3 drives the film F in the loaded film cartridge FC; optically scans or reads pictures recorded in respective frames of the film F; and converts the read pictures into electrical picture signals.

The image processor 4 generates from the received picture signals an image signal representative of an image to be printed. Upon receipt of the image signal, the printer 5 prints the pictures represented by the image signal on the print sheet of specified size in a specified layout designated from the controller 6.

The printer 5 may be of thermal type, of fusion type and of sublimation type. Alternatively, an electrostatic copier including a photosensitive drum may be used as the printer 5.

The controller 6 causes the film loader 2, film scanner 3, image processor 4, and printer 5 to perform their respective specified operations from the reading operation of the pictures to the printing operation. It may be appreciated to provide an externally setting panel at an appropriate portion of the printing apparatus 1, if necessary.

Figure 2A:
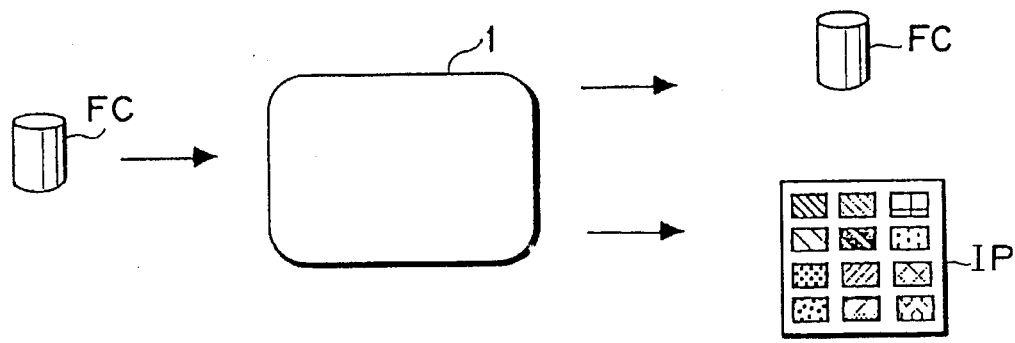
FIGS. 2A to 2C are schematic diagrams showing loading/discharging modes which are executable in the multi-picture image printing system.
Figure 2B:
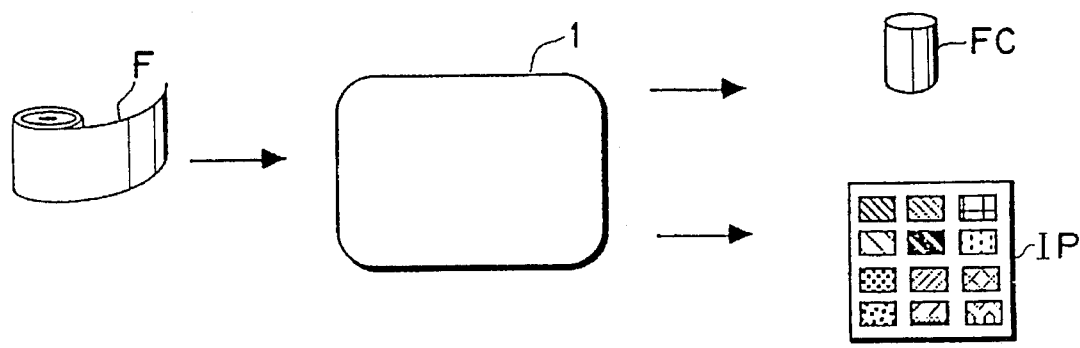
Figure 2C:
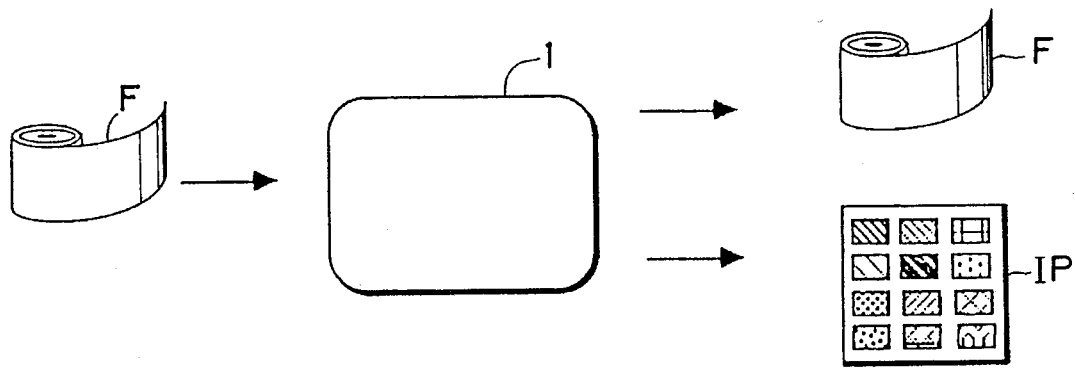

FIGS. 2A to 2C are schematic diagrams showing loading/discharging modes which are executable in the multi-picture image printing system.

FIG. 2A shows a loading/discharging mode according to which the film cartridge FC is loaded in the printing apparatus 1 and is discharged in correspondence with the print sheet IP after the printing operation. FIG. 2B shows a loading/discharging mode according to which the roll film F is loaded in the printing apparatus 1 and a film cartridge FC containing the roll film F is discharged in correspondence with the print sheet IP after the printing operation. FIG. 2C shows a loading/discharging mode according to which the roll film F is loaded in the printing apparatus 1 and is discharged in correspondence with the print sheet IP after the printing operation.

Figure 3A:
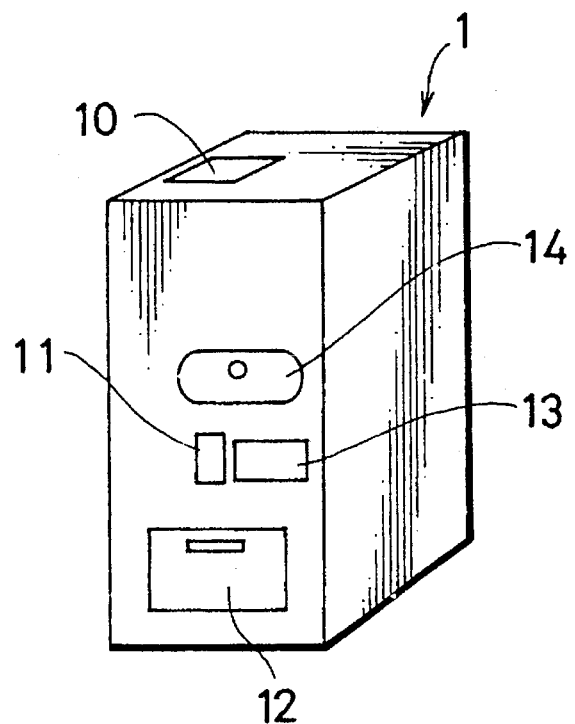
FIGS. 3A and 3B are perspective views showing external arrangements of a printing apparatus of the multi-picture image printing system, FIG. 3A showing an tower type arrangement, and FIG. 3B showing a desk-top type arrangement.
Figure 3B:
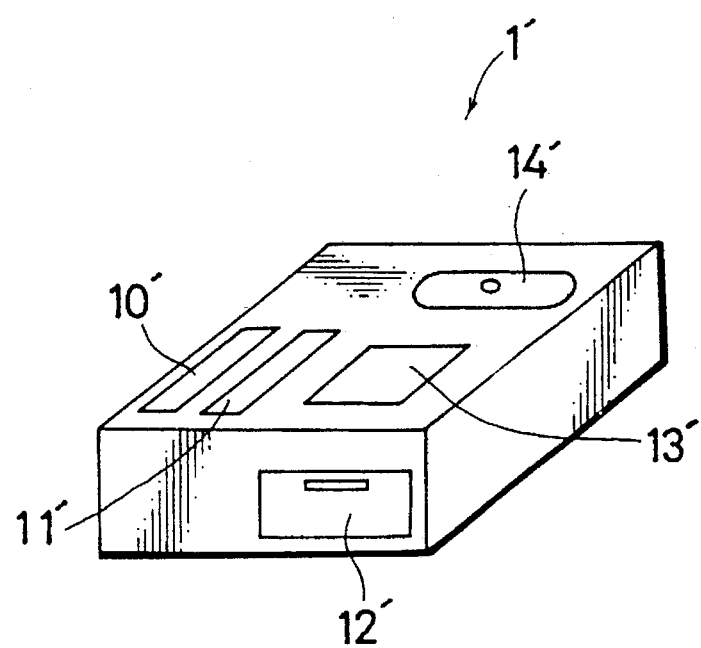
Figure 4:
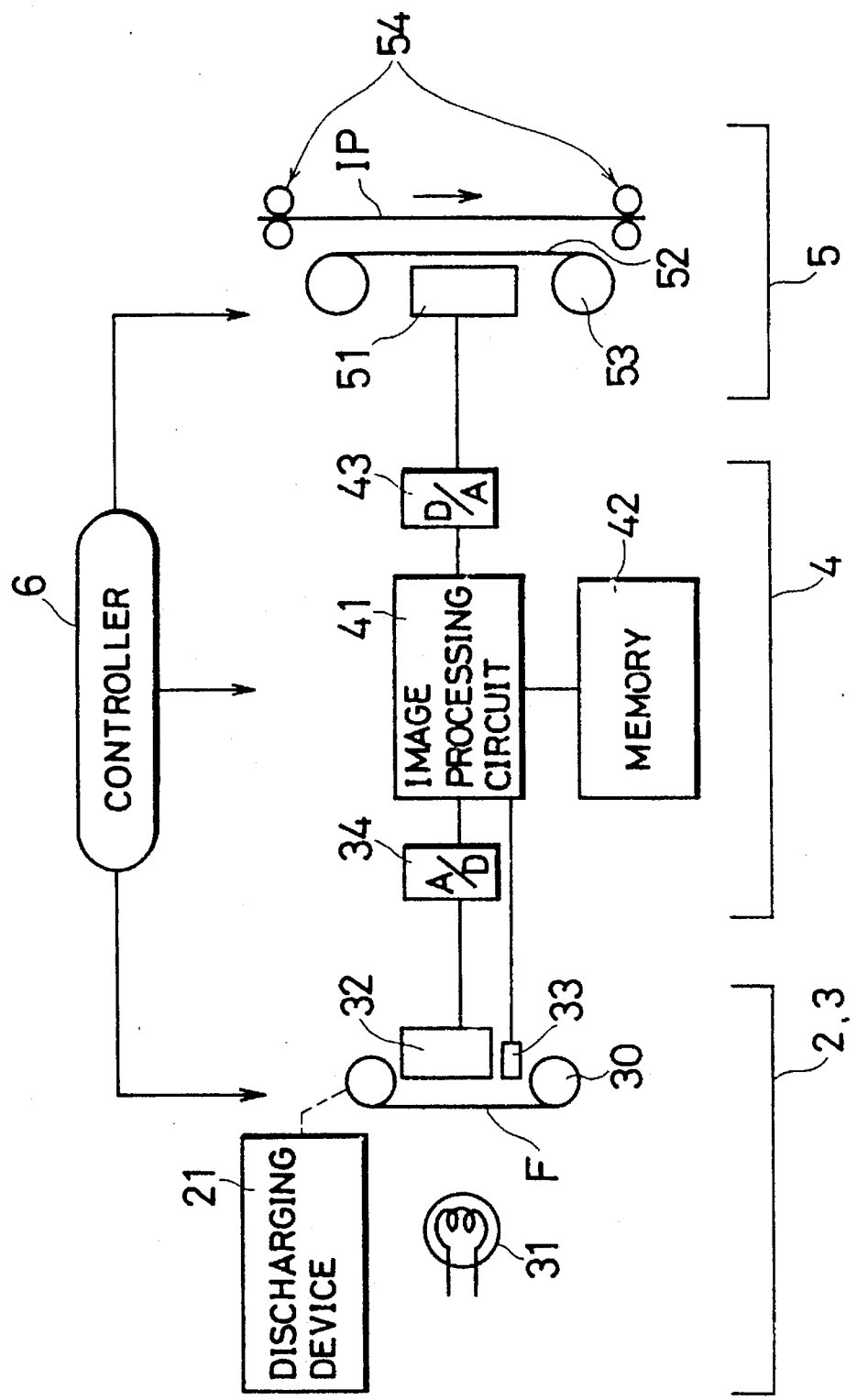
FIG. 4 is a diagram showing a principal construction of the printing apparatus.

FIGS. 3A and 3B are perspective views showing exemplary external arrangements of the printing apparatus 1. FIG. 3A showing an tower type arrangement, and FIG. 3B showing a desk-top type arrangement. FIG. 4 is a schematic diagram showing a principal construction of the printing apparatus 1.

In FIG. 3A, the printing apparatus 1 is provided on its top surface with a cartridge inlet 10 through which the film cartridge FC is inserted and in the middle of its front surface a cartridge outlet 11. At a lower part of the front surface, there is provided a sheet setting portion 12 in which print sheets on which the pictures are printed are set. A sheet outlet 13 is provided at one side of the cartridge outlet 11. At a position slightly above the middle of the front surface, there is provided an ink-film setting portion 14 for the printer 5.

In FIG. 3B, a printing apparatus 1' is provided at left end of its upper surface with a cartridge inlet 10' and a cartridge outlet 11' in side-by-side relationship. A sheet setting portion 12' is provided at the right side of the front surface and a sheet outlet 13' is provided at the right side of the upper surface next to the cartridge outlet 11'. An ink-film setting portion 14' is provided at the rear side of the upper surface.

The mechanism of the film loader 2 includes the cartridge inlet 10 (10') and the cartridge outlet 11 (11'). As shown in FIG. 4, the film loader 2 loads the film cartridge FC in the printing apparatus 1 and engages it with a film feeding mechanism 30.

The film feeding mechanism 30 includes a feed motor which is controlled by the controller mechanism for transmitting a rotational force to feed and rewind the film and an engaging portion which is rotatably engaged with a center shaft of the film cartridge FC. The mechanism 30 enables the feeding and the rewinding of the film. Since the film cartridge FC is engaged with the mechanism 30 after being loaded, it is not mistakenly taken out while being fed.

The above engagement is released by a discharge device 21 upon completion of the reading of pictures and the rewinding of the film, or at a specified timing. Then, the film cartridge FC is moved to the cartridge outlet 11 (11') to be automatically discharged. The discharging operation may also be such that the engagement at the loaded position is released or a cartridge loaded portion is rotated, for example, by 180° on a vertical plane to fall down due to its weight upon receipt of a discharge command from the controller 6, to thus be guided to the cartridge outlet 11 (11'). The film cartridge FC may be moved to the cartridge outlet 11 (11') by a transport member.

The film scanner 3 includes the film feeding mechanism 30, a light source 31 for illuminating the film, an image reader 32 including photoelectric conversion elements such as CCDs which are opposed to the light source 31 at a specified distance and are arranged in a matrix, and an ID code reader 33. The above elements are arranged such that respective frames of the film F being fed by the film feeding mechanism 30 pass a projecting position between the light source 31 and the image reader 32.

The image reader 32 is arranged such that the plane of the photoelectric conversion elements is located where projected pictures of the respective frames are formed.

The film feeding mechanism 30 sets the respective frames at the projecting position one after another by optically detecting the perforations formed in the film F in correspondence with the respective frames thereof by means of a photodetector or by rotating the feed motor by an amount corresponding to the length of one frame. Thus, the pictures recorded on one film can be read one after another.

The read pictures are converted into digital signals by way of the image reader 32 and an analog-to-digital (A/D) converter 34 to be fed to the image processor 4. The film feeding mechanism 30 also detects a frame number of the film F in accordance with a feed motor drive signal, by means of the photodetector for detecting the perforations, or by means of an additional frame number detector.

The ID reader 33 optically or magnetically rads the ID code written at a specified position of the film cartridge FC or the film F.

Figure 5A:
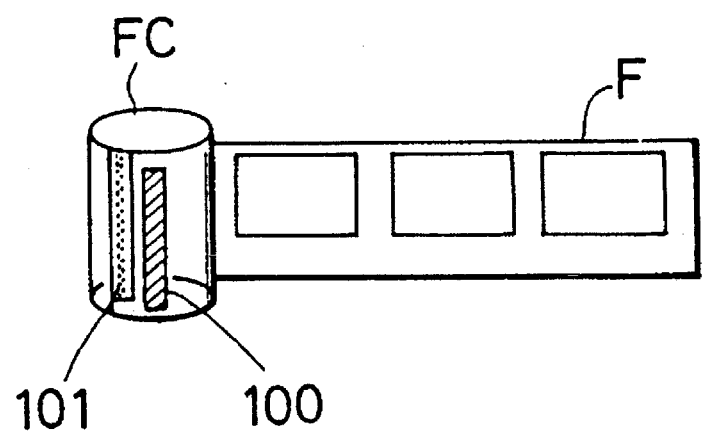
FIGS. 5A and 5B are diagrams showing a position where an ID code is written, FIG. 5A showing a case where the ID code is written on a film cartridge FC, and FIG. 5B showing a case where it is written at a specified position of a film F.
Figure 5B:
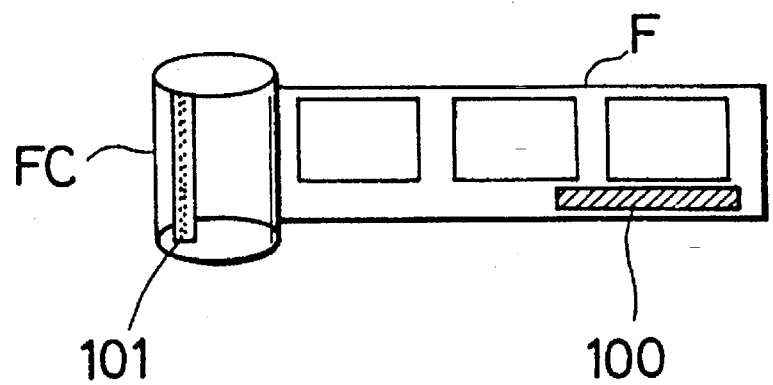

FIGS. 5A and 5B are diagrams showing a position where an ID code is written, FIG. 5A showing a case where the ID code is written on a film cartridge FC and FIG. 5B showing a case where it is written at a specified position of a film F.

In FIG. 5A, there are provided at specified positions of the outer surface of the film cartridge FC an ID code portion 100 written in the form of, e.g., a bar code which is optically or magnetically readable, and another ID code portion 101 written by use of characters and numbers one can recognize. The contents written in the ID code portions 100 and 101 may include a data concerning one who has deposited the film for the development or merely an identifiable specific data. The data written in the ID code portions 100 and 101 correspond with each other. In FIG. 5B, the ID code portion 100 is provided at a specified position of the film F outside the frame region.

Further, in the case of the roll film F, no ID code is likely to be provided. In this case, it may be appreciated to print appropriate ID code at a loader portion of the roll film F, and at a corner portion of the print sheet IP during the time when the roll film is mounted in the printing apparatus 1.

The image processor 4 includes an image processing circuit 41 for converting the received picture signals into an image signal representative of an image to be printed on the print sheet. Particularly in the case where the pictures are RGB color pictures, the received picture signals are converted into color image signals of Cy, Mg, Ye and Bk and, if necessary, a white balance is applied thereto based on the detected color temperature of the light source 31.

The image processor 4 is also provided with a memory 42 for storing a program or a table for determining a print layout and the size of picture based on the read frame number of the film F and the size of the print sheet IP.

Figure 6A:
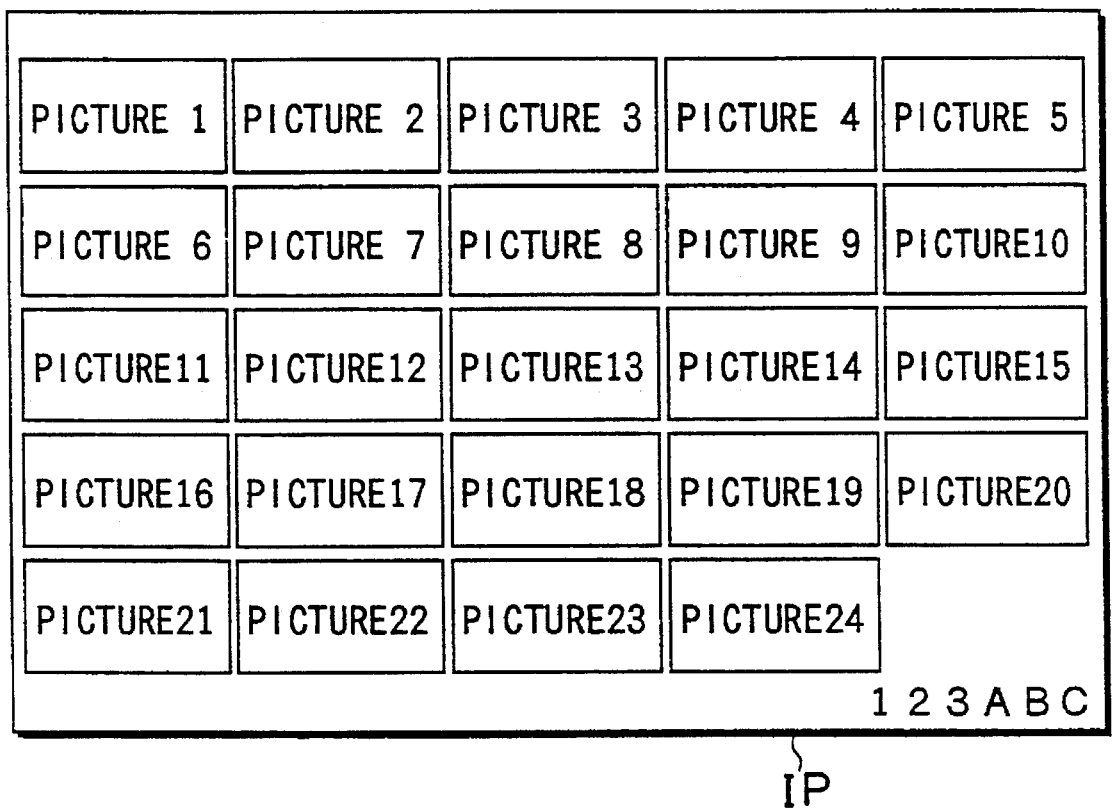
FIGS. 6A to 6E are diagram showing multi-picture images of different layouts which are generated in the printing apparatus.

The memory 42 stores a variety of predetermined layouts as shown in FIGS. 6A to 6E. FIG. 6A shows an exemplary multi-picture image of a matrix layout. This layout arranges all the pictures recorded on one film F in a single frame. In FIG. 6A, specifically, twenty four pictures are arranged at a specified interval in a matrix of (5, 5) in a single frame. Also, character information, i.e., ID code of 123ABC, is placed at a right lower corner of the frame. Such multi-picture image is used as index of the pictures recorded on the film.

Figure 6B:
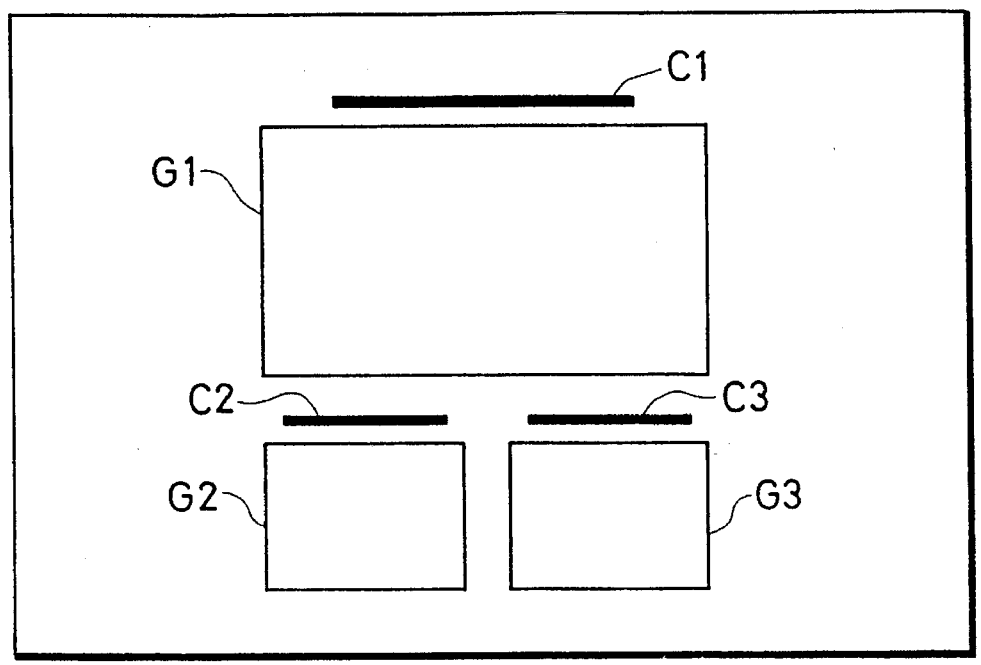
Figure 6C:
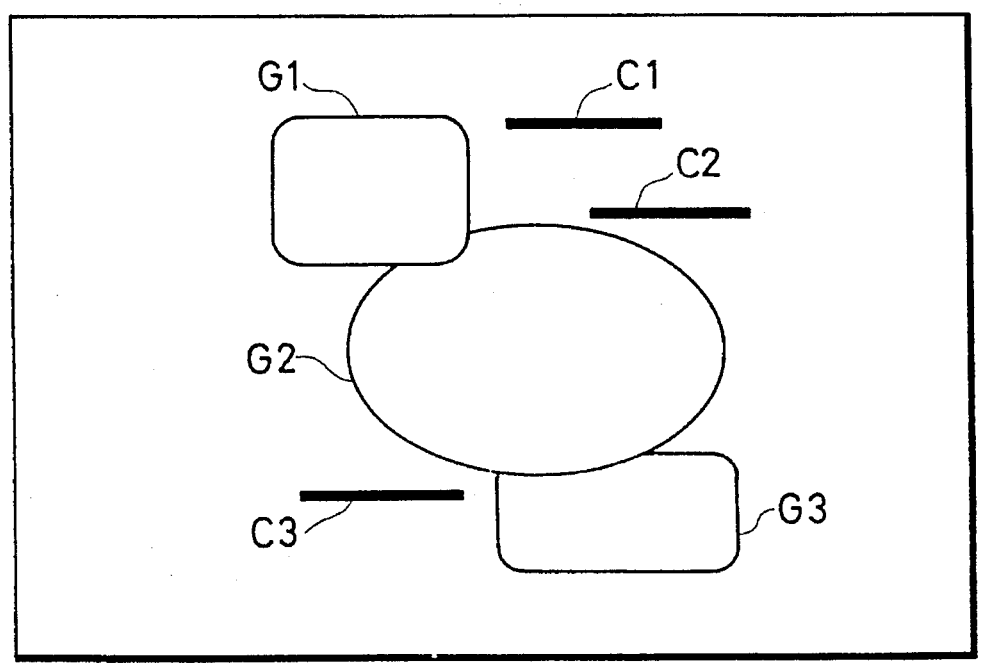
Figure 6D:
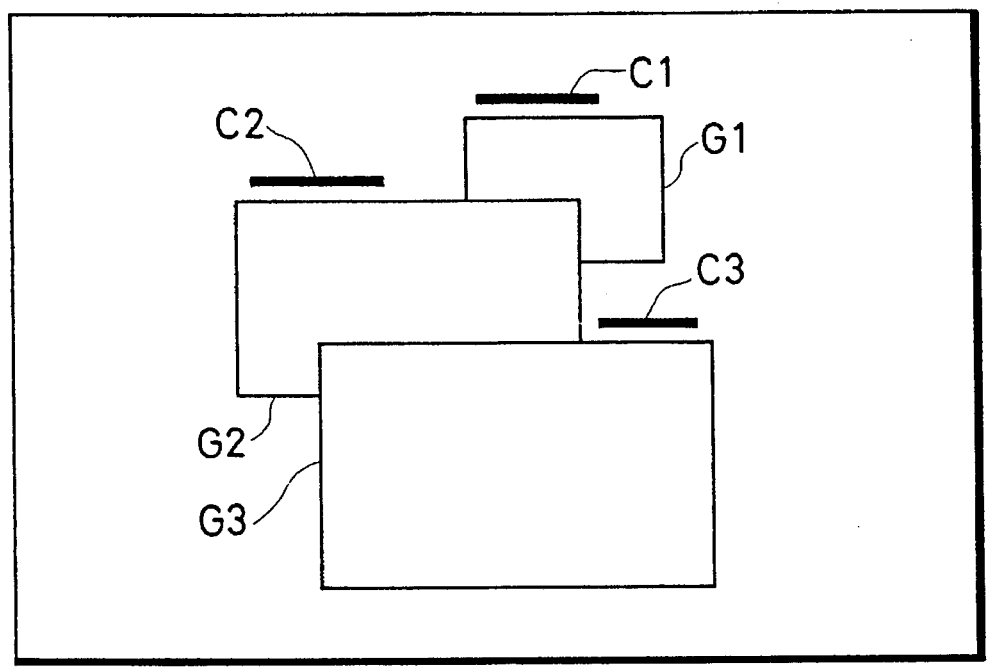
Figure 6E:
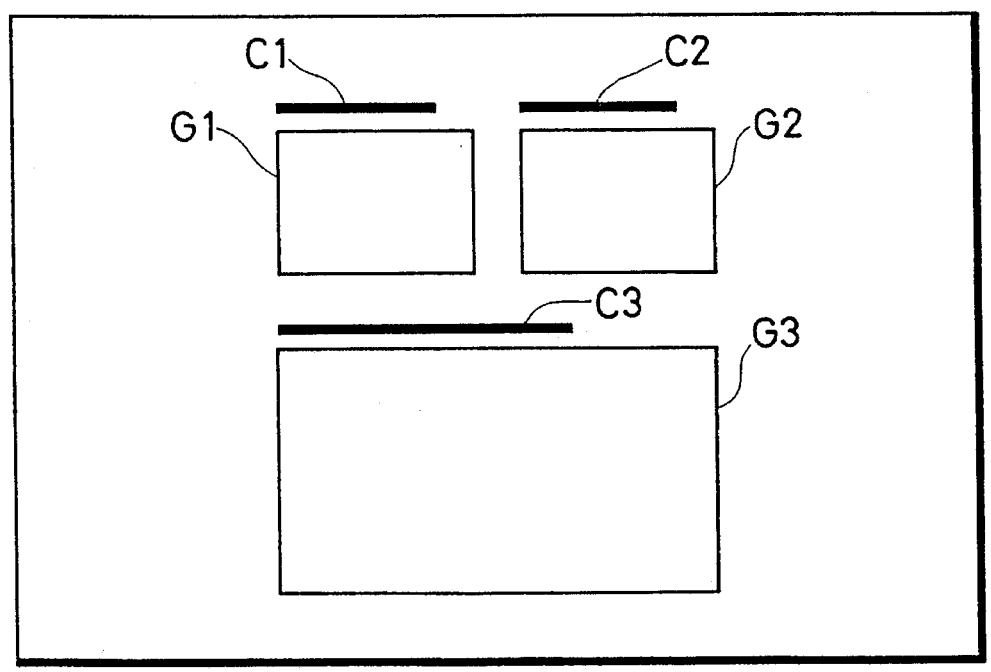

FIGS. 6B to 6E show multi-picture images of different tier layouts. In FIGS. 6B and 6E, different sized pictures are arranged in a vertical direction. In FIGS. 6C and 6D, different sized pictures are partially superimposed one another. Information (C1, C2, C3) of characters is placed near each picture (G1, G2, G3). In these layouts, typical pictures are selected among pictures recorded on one film and arranged in a selected layout in a single frame. Such multi-picture images are used to summarize the pictures recorded on the film F.

The processed image signal is converted into an analog signal by a digital-to-analog (D/A) converter 43 to be output to the printer 5. The above picture processing may include a variety of picture quality corrections such as emphasis on edges and a processing for allowing character information to be printed together with the pictures.

The ID code read by the ID code reader 33 is decoded so that it can be printed at a right bottom position of the print sheet IP in a recognizable manner, i.e. in the same manner as the data are written in the ID code portion 101. Thus, even if the film cartridges FC and the print sheets IP are mixed, thereby messing up the pairing thereof, the correct correspondence can be easily reconfirmed.

The printer 5 includes a thermal transfer head 51 to which the multi-picture image signal output from the image processor 4 is fed, an ink-film 52, an ink-film feeder 53 for feeding the ink-film 52, and a sheet transport 54 which is driven upon receipt of a driving force from an unillustrated driving source and includes a plurality of pairs of transport rollers for transporting the print sheet IP from the sheet setting portion 14 to a downstream side. The sheet outlet 13 (13') is provided at the downstream side with respect to a sheet transport direction.

The head 51 extends in a direction normal to the sheet transport direction by the width of the print sheet IP, includes a plurality of head elements arrayed in a row in the lengthwise direction thereof and a plurality of latch circuits corresponding to the respective head elements. The head elements are not necessarily arrayed in a row, but may be arrayed in a plurality of narrowly spaced rows to form one line. The image signal from the image processor 4 for each line is fed to all the head elements simultaneously after being temporarily transferred to the latch circuits.

The above signal feeding and the feed of the print sheet IP for one line are alternately repeated and consequently the pictures for one print sheet are printed. The ink-film 52 in use may be a black (BK) one or the one including color portions of Cy, Mg, Ye and Bk at given intervals. In the case of color printing, the color setting operation for the four colors of the ink-film 52 and the transfer operation are added to the above operations which are repeated alternately.

In this embodiment, the ID code is printed together with the pictures by the thermal head 51. However, it may be possible to provide another printing head for printing ID code on a rear surface of the print sheet IP.

The sheet transport 54 transports, for example, a multitude of sheets stacked up in the upstream located sheet setting portion 12 one by one upon receipt of the print command. The print sheet IP bearing a printed image is transported and discharged from the sheet outlet 13 (13').

Next, there will be described with reference to FIGS. 7 to 9 a storing unit 7 which is connected to the printing apparatus 1 to execute pairing of discharged film cartridges FC (or film F) and print sheets IP.

Figure 7:
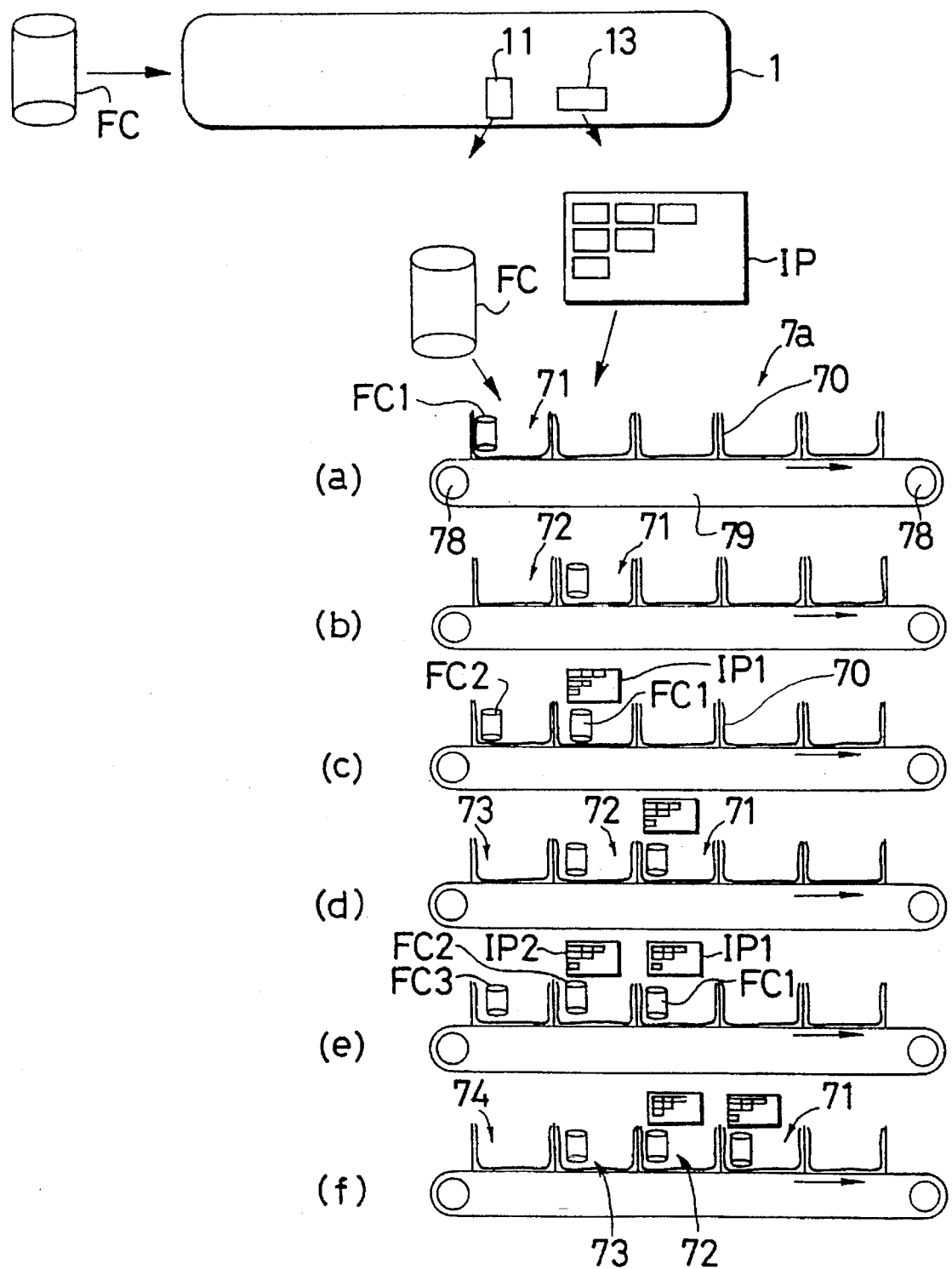
FIGS. 7 to 9 are diagrams showing first to third storing units of the multi-picture image printing system.

FIG. 7 shows a first storing unit 7a. The storing unit 7a includes a plurality of containers 71, 72, . . . arranged in a row. The respective containers are conveyed in one direction by an endless conveyor belt 79 stretched between pulleys 78, 78 spaced apart by a specified distance. Each container is provided with a bag 70 for packaging discharged film cartridge FC or film F, and print sheet IP.

To one of the pulleys is transported a rotating force from an unillustrated driving source which is controlled by the controller 6. The conveyor belt 79 is stretched below the cartridge outlet 11 and the sheet outlet 13, so that the discharged film cartridge FC and print sheet IP are securely contained in the containers 71, 72, . . . being conveyed.

The cartridge outlet 11 and the sheet outlet 13 are formed at different positions of the printing apparatus 1. In connection with the containers 71, 72, . . . conveyed below these outlets 11, 13, the film cartridge FC and the print sheet IP are discharged at different timings.

The respective discharging timings are described with reference to moving stages (a) to (f) of the conveyor belt 79. In FIG. 7, the conveyor belt 79 is moving clockwise as indicated by an arrow and the cartridge outlet 11 is located at the upstream of the conveyor belt 79 and the sheet outlet 13 is located more downstream from the cartridge outlet 11 by one container.

In the stage (a), the container 71 is stopped below the cartridge outlet 11 and a film cartridge FC1 containing a film whose pictures are read is discharged into the container 71 through the cartridge outlet 11.

After the discharge of the film cartridge FC1, the conveyor belt 79 is moved by one container (stage (b)) and waits on stand-by. After completion of the printing of the read pictures, a print sheet IP1 is discharged into the container 71 through the sheet outlet 13 (stage (c)).

In this state, the next film cartridge FC2 is discharged into the container 72. The discharging timings of the print sheet IP1 and the film cartridge FC2 depend upon a timing at which the film cartridge FC2 is loaded in the printing apparatus 1 or a time which elapses until the printing of the pictures following the reading thereof. The conveyor belt 79 remains in position at least until both the print sheet IP1 and the film cartridge FC2 are discharged.

When both the print sheet IP1 and the film cartridge FC2 are discharged, the conveyor belt 79 is moved by one container and waits on stand-by (stage (d)). Then, a print sheet IP2 is discharged into the container 72 and a film cartridge FC3 is discharged into the container 73 (stage (e)). Similarly, when both the print sheet IP2 and the film cartridge FC3 are discharged, the conveyor belt 79 is moved by one container and waits on stand-by (stage (f)). Hereafter, each time the film cartridge FC is loaded into the printing apparatus 1, the print sheets IP and the film cartridges FC are repeatedly discharged in the manner as described above.

Since the film cartridges FC and the print sheets IP are automatically discharged in correspondence into the same containers, they are always paired in correct correspondence.

Figure 8:
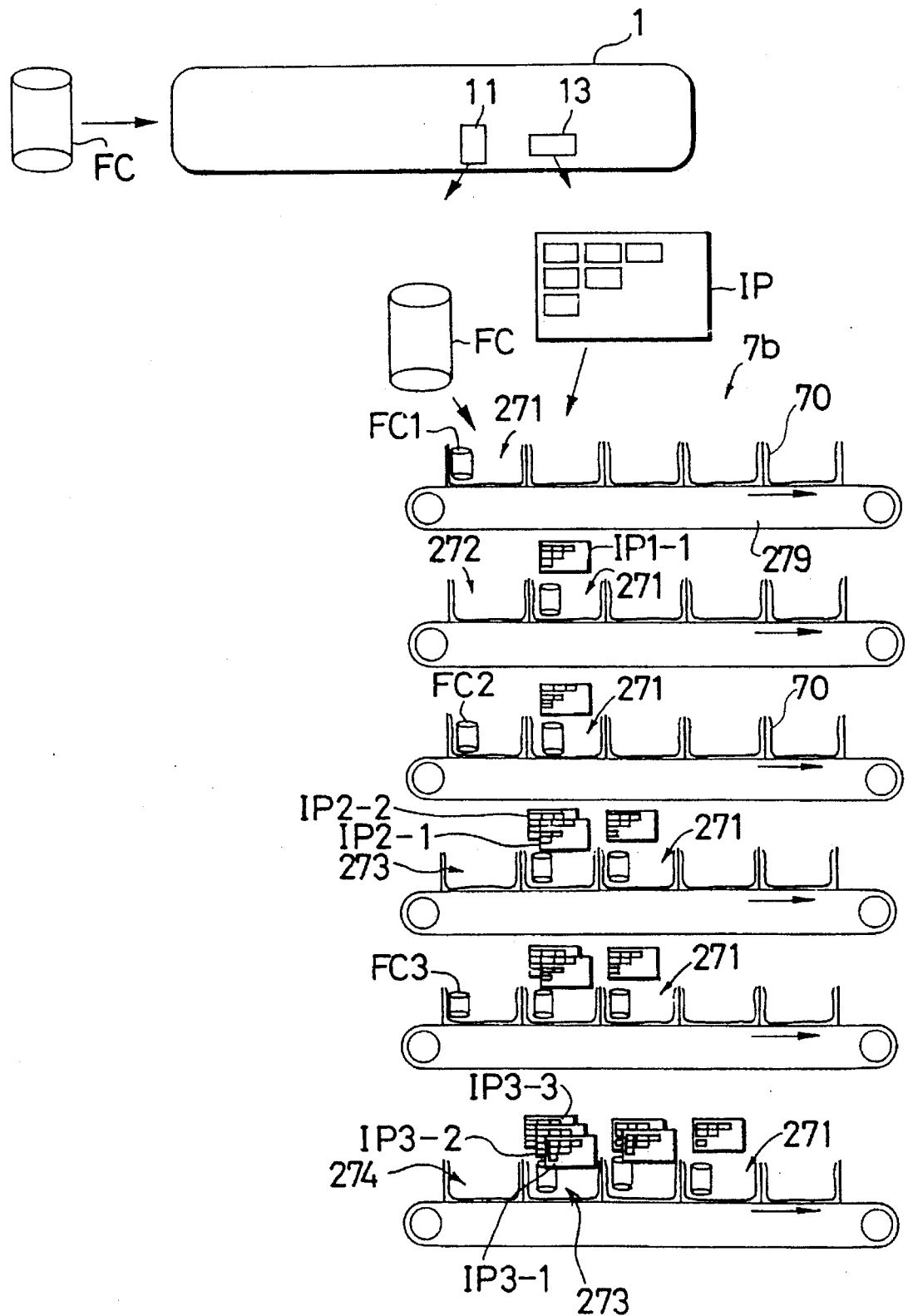

FIG. 8 shows a second storing unit 7b. The second storing unit 7b is similar to the first storing unit 7a but is advantageous when the number of print sheets IP corresponding to one film cartridge FC is not fixed.

The case where the number of print sheets IP corresponding to one film cartridge FC is not fixed specifically means as follows. For example, when arranging twenty four pictures in the (5, 5) matrix layout, the twenty four pictures can be arranged one print sheet IP. However, when arranging thirty six pictures in the (5, 5) matrix layout, the thirty six pictures must be arranged on two print sheets IP. Although the thirty six pictures can be arranged on one print sheet IP if the layout of (6, 6) matrix is employed, the size of picture will become too small with this layout. In the case of arranging thirty six pictures in the (5, 5) matrix layout, twenty five pictures are arranged on a first print sheet IP1 and remaining eleven pictures are arranged on a second print sheet IP2. Further, when arranging fifty two pictures in the (4, 5) matrix layout, three print sheets will be required.

The structure of the second storing unit 7b and the positional relationship between the cartridge outlet 11 and the sheet outlet 13 are identical to those of the first storing unit 7a.

Let it be assumed that, in FIG. 8, the film cartridge FC1 contains a film bearing twenty four pictures, the film cartridge FC2 a film bearing thirty six pictures, and the film cartridge FC3 a film bearing fifty pictures.

When the film cartridge FC1 is loaded in the printing apparatus 1, the feed of the film is started and pictures are read. While pictures are read from the respective frames, the frame number is detected. A container 271 is located below the cartridge outlet 11 and stopped thereat (stage (a)). The film cartridge FC1 containing the film from which the pictures have been read is discharged into the container 271 through the cartridge outlet 11.

After the discharge of the film cartridge FC1, a transport belt 279 is moved by one container (stage (b)) and waits on stand-by. Since the film cartridge FC1 contains the film bearing twenty four pictures, one print sheet IP1-1 is discharged into the container 271 through the sheet outlet 13 (stage (b)). Since the number of the print sheet to be discharged is one, the pictures corresponding to the next film cartridge FC2 are read at this position and the transport belt 279 waits on stand-by until the film cartridge FC2 is discharged into a container 272 (stage (c)).

Upon completion of the discharge of the print sheet IP1-1 and film cartridge FC2, the transport belt 279 is moved by one container and waits on stand-by. Subsequently, the first and second print sheets IP2-1, IP2-2 corresponding to the film cartridge FC2 are discharged into the container 272 one by one (stage (d)). The film cartridge FC3 is then discharged into a container 273 (stage (e)). Upon completion of the discharge of the print sheets IP2-1, IP2-2 and film cartridge FC3, the transport belt 279 is moved by one container and waits on stand-by.

Subsequently, the first to third print sheets IP3-1, IP3-2, IP3-3 corresponding to the film cartridge FC3 are discharged one after another into the container 273 (stage (f)). The film cartridge FC4 is then discharged into a container 274. Upon completion of the discharge of the print sheets IP3-1, IP3-2, IP3-3 and film cartridge FC4, the transport belt 279 is moved by one container and waits on stand-by. Hereafter, each time the film cartridge FC is loaded in the printing apparatus 1, the film cartridge FC and the print sheets IP are repeatedly discharged.

In this way, even in the case where the number of the print sheets IP corresponding to the film cartridges FC is not fixed, the film cartridges FC and the print sheets IP can be automatically discharged into the same container in correct correspondence.

In the second storing unit 7b, similarly to the first storing unit 7a, each container is provided with a bag 70 for packaging the discharged film cartridge FC and the print sheet IP.

Figure 9:
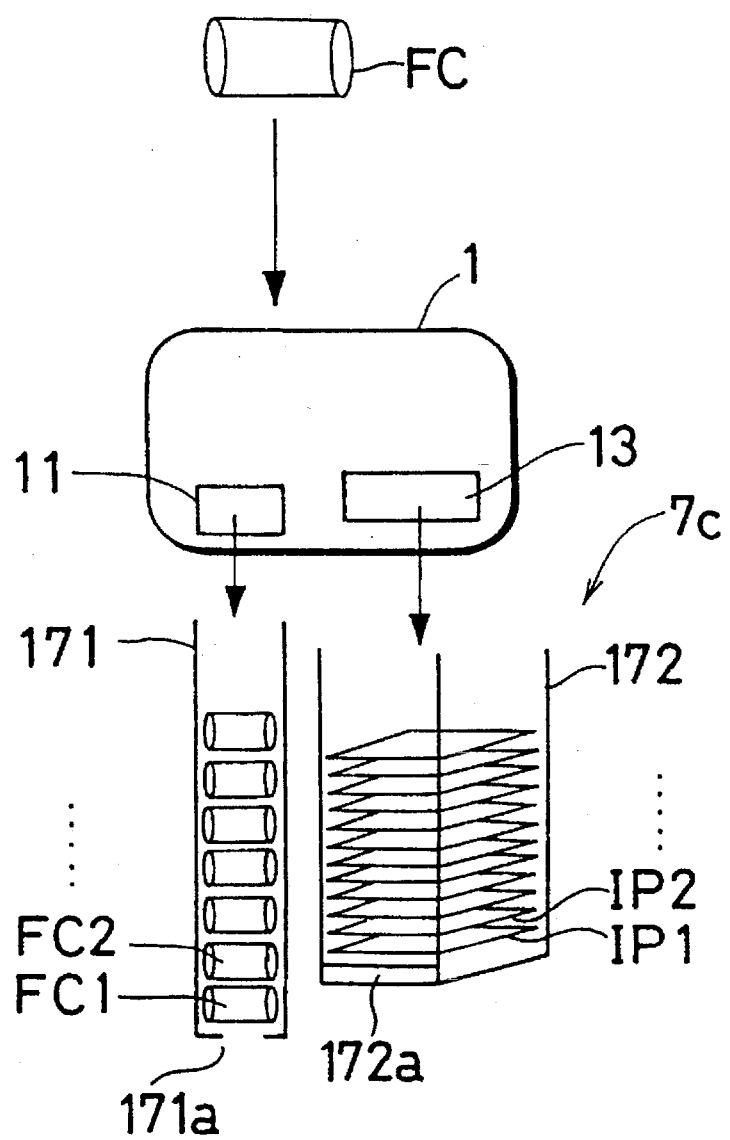

FIG. 9 shows a third storing unit 7c. The third storing unit 7c includes a cartridge container 171 and a sheet container 172. The cartridge container 171 is provided right below or in communication with the cartridge outlet 11 and a sheet container 172 is provided right below or in communication with the sheet outlet 13. These containers 171 and 172 stand either upright or at a specified angle with respect to the vertical direction.

The cartridge container 171 has, for example, such an inner cross-section that the cylindrical film cartridges FC can be stacked up with being laid on their sides, and an opening 171a of a small diameter and of deformable elastic material is formed at the bottom end thereof. The cartridge container 171 may have a closed bottom. In this case, the opening 171a may be formed at the bottom of one side surface so that the film cartridges FC can be taken out sideways.

The sheet container 172 has such an inner cross-section that the print sheets IP can be stacked up therein, and an opening 172a is formed at the bottom of one side surface or two neighboring side surfaces such that one, two, or three print sheets can be taken out sideways therethrough. The opening 172a may be formed at the bottom surface of the sheet container 172. This opening 172a has a size slightly smaller than the size of the print sheets IP and is made of deformable elastic material. The print sheets may be taken out from the bottom one by one with use of a suction device such as a syringe.

With the above construction, one film cartridge FC and one print sheet IP are taken out of the openings 171a and 172a as a pair, thereby making a correspondence therebetween. In other words, the film cartridge FC1 and the print sheet IP1, the film cartridge FC2 and the print sheet IP2, and similarly the corresponding film cartridges FC and print sheets IP are taken out.

In the third storing unit 7c, the number of the print sheets IP corresponding to one film cartridge FC needs to be set at a constant number. For example, it is set such that one print sheet IP correspond to each film cartridge FC.

Next, there will be described discharge timing of the film cartridge FC and the print sheet IP. It should be noted that if the film cartridge FC is discharged immediately after the completion of picture reading, the problem will occur that the correspondence of film cartridges FC and print sheets IP will be unclear. For example, in the case of processing a plurality of films each carrying twenty four pictures, the following unclearness will occur. A first film cartridge FC1 is set in the printing apparatus 1 and recorded pictures (e.g., 24 pictures) are read for a given scanning time (e.g., 30 seconds). The read pictures are processed for a give processing time (e.g., 10 seconds). The generated multi-picture image is printed on a first print sheet IP for a given printing time (e.g., 55 seconds). The pictures recorded on the film contained in a second film cartridge FC2 is read upon completion of the image processing to the pictures recorded on the film contained in the first film cartridge FC1.

Accordingly, the second film cartridge FC2 is loaded in the printing apparatus 1 and the pictures corresponding thereto are read. Since the reading of the pictures corresponding to the second film cartridge FC2 is completed before completion of the printing of the multi-picture image corresponding to the first film cartridge FC1, the second film cartridge FC2 is discharged before the first print sheet IP1 corresponding to the first film cartridge FC1 is discharged (printing time). Thus, it becomes unclear whether the first print sheet IP1 corresponds to the first film cartridge FC1 or the second film cartridge FC2.

Figure 10:
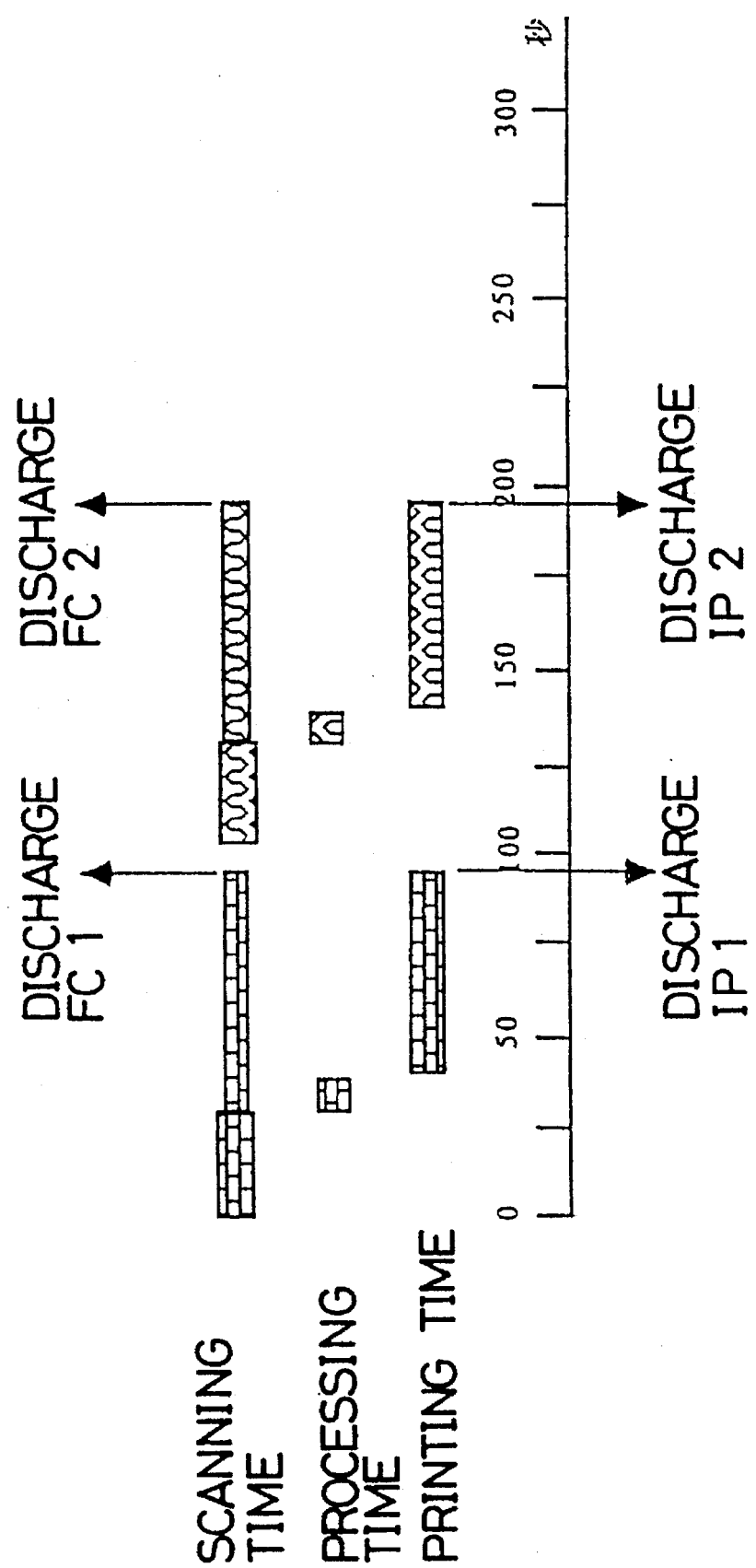
FIG. 10 is a timing chart showing a relationship between pictures reading and multi-picture image printing of the multi-picture image printing system.

In this embodiment, film cartridges FC are discharged at the same time as the corresponding print sheet IP is discharged as shown in FIG. 10.

More specifically, a first film cartridge FC1 is loaded in the printing apparatus 1 and a plurality of pictures (e.g., 24 pictures) recorded on the film FC1 are read for scanning time (e.g., 30 seconds). The read pictures are processed for a processing time (e.g., 10 seconds). A generated multi-picture image is printed on a first print sheet IP for a printing time (e.g., 55 seconds). During this time, the controller 6 causes the first film cartridge FC1 to be engaged with the film feeding mechanism 30. When the first print sheet IP1 is discharged upon completion of the printing of the pictures thereon, the first film cartridge FC1 is disengaged from the mechanism 30 and is discharged.

After the discharge of the first print sheet IP1 and the first film cartridge FC1, a second film cartridge FC2 is loaded in the printing apparatus 1. Similarly, the second film cartridge FC2 is discharged at the same time when a second print sheet IP2 is discharged. In this way, the first film cartridge FC1 and first print sheet IP1, the second film cartridge FC2 and second print sheet IP2, and the corresponding film cartridges and print sheets are discharged simultaneously as a correct pair.

The above-mentioned discharging and pairing operations are described in connection with the first mode where the film cartridge FC is loaded and discharged. However, it will be apparent that the present invention can be applied to the second mode where the roll film F is loaded and discharged with being contained in the film cartridge FC as shown in FIG. 2B, and to the third mode where the roll film F is loaded and discharged as it is as shown in FIG. 2C.

Specifically, in the second mode, the operation may be carried out as follows. The roll film F is loaded in the printing apparatus 1. After the reading of the pictures, the roll film F is mounted in the cartridge FC set in the printing apparatus 1 prior to the loading of the roll film F or the reading of pictures by use of the film loader 2, film feeding mechanism 30 or other element. Subsequently, a multi-picture image is generated and printed, and the cartridge FC and the print sheet IP are discharged at the same time in similar to the first mode.

Also, in the third mode, the roll film F is loaded in the printing apparatus 1 and read. Thereafter, the film F is held in the film feeding mechanism 30, and discharged at the same time when discharging the print sheet IP.

Further, in the second and third modes, the film is not limited into the roll film. It may be possible to use straight cut films.

The invention may be embodied in the following modified manners. The frame number of the film contained in the film cartridge FC and the print layout may be set in advance. This enables the correspondence of a plurality of film cartridges FC and one print sheet IP and the correspondence of a plurality of film cartridges FC and a plurality of print sheets IP.

Further, pictures to be read are not limited to those recorded on the film by means of a photographing operation, but may be those recorded on a magnetic recording medium, photomagnetic disk, or like disk type recording medium.

As described above, a multi-picture image printing system according to the invention is provided with a container unit including at least two containers and a discharge device for discharging a recording medium which is loaded in the printing apparatus and from which pictures are read and a print sheet on which the pictures from the recording medium are printed into the same container. Accordingly, the corresponding recording medium and print sheet can be automatically discharged as a pair. This prevents the erroneous pairing of the recording medium and the print sheet. Thus, the recording media and the print sheets can be paired in correct correspondence.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A multi-picture image printing system comprising:
    a reception portion for receiving a plurality of recording mediums sequentially, each recording medium carrying a plurality of pictures;
    a multi-picture image generator operable to read the plurality of pictures recorded on each recording medium and generate a multi-picture image based on the read plurality of pictures;
    a printer operable to print the generated multi-picture image on a sheet;
    a medium discharger operable to discharge recording mediums;
    a sheet discharger operable to discharge printed sheets;
    a storing unit including a plurality of containers for containing discharged recording medium and printed sheet; and
    a controller operable to control the medium discharger, sheet discharger, and the storing unit to place a recording medium and a printed sheet bearing a multi-picture image having pictures recorded on the recording medium in the same container.

2. A multi-picture image printing system as defined in claim 1, wherein each of the plurality of containers is provided with a bag for packaging a recording medium and print sheet.

3. A multi-picture image printing system as defined claim 1, wherein the printer includes a thermal transfer printing head.

4. A multi-picture image printing system as defined in claim 1, wherein the medium discharger has a fixed discharge outlet at a first position, the sheet discharger has a fixed discharge outlet at a second position different from the first position, and the storing unit further includes a driver operable to move each container from the first position to the second position or from the second position to the first position.

5. A multi-picture image printing system as defined in claim 4, wherein the storing unit further includes a take-out portion, and the container containing the discharged medium and printed sheet is moved to the take-out portion.

6. A multi-picture image printing system as defined claim 1, further comprising:
   a first ID code writing device operable to write an identification code on a received recording medium; and
   a second ID code writing device operable to write the same identification code on a printed sheet having pictures recorded on the recording medium.

7. A multi-picture image printing system as defined in claim 1, wherein each recording medium is provided with an identification code, the system further comprising:
   an ID code reading device operable to read the identification code provided on a received recording medium; and
   an ID code writing device operable to write the read identification code on a printed sheet having pictures recorded on the recording medium.

8. A multi-picture image printing system as defined in claim 1, wherein the multi-picture image generator generates a multi-picture image having all the plurality of pictures recorded on each recording medium.

9. A multi-picture image printing system comprising:
   a reception portion for receiving a plurality of recording mediums sequentially, each recording medium carrying a plurality of pictures;
   a multi-picture image generator operable to read the plurality of pictures recorded on each recording medium and generate a multi-picture image based on the read plurality of pictures;
   a printer operable to print the generated multi-picture image on a sheet;
   a medium discharger operable to discharge the received recording mediums in a predetermined order; and
   a sheet discharger operable to discharge a printed sheet corresponding to each recording medium in the same order as the recording mediums.

10. A multi-picture image printing system as defined in claim 9, wherein the recording medium is a film stored in a cartridge case, the system further comprising:
    a first container operable to store discharged cartridge cases each holding a corresponding film, the first container having;
       an inlet opening to permit the discharged cartridge cases to move in the first container in the discharging order; and
       an outlet opening to permit the discharged cartridge cases to be taken out from the first container in the discharging order;
    second container operable to store discharged printed sheets, the second container having;
       an inlet opening to permit the discharged printed sheets to move in the second container in the discharging order; and
       an outlet opening to permit the printed sheets to be taken out from the second container in the discharging order.

11. A multi-picture image printing system as defined in claim 9, wherein the multi-picture image generator generates a multi-picture image having all the plurality of pictures recorded on each recording medium.

12. A multi-picture image printing system as defined in claim 11, wherein the recording medium is a film stored in a cartridge case, the system further comprising:
    a first container operable to store discharged cartridge cases each holding a corresponding film, the first container having;
       an inlet opening to permit the discharged cartridge cases to move in the first container in the discharging order; and
       an outlet opening to permit the discharged cartridge cases to be taken out from the first container in the discharging order;
    a second container operable to store discharged printed sheets, the second container having;
       an inlet opening to permit the discharged printed sheets to move in the second container in the discharging order; and
       an outlet opening to permit the printed sheets to be taken out from the second container in the discharging order.

13. A multi-picture image printing system as defined in claim 9, further comprising:
    a first ID code writing device operable to write an identification code on a received recording medium; and
    a second ID code writing device operable to write the same identification code on a printed sheet having pictures recorded on the recording medium.

14. A multi-picture image printing system as defined in claim 9, wherein each recording medium is provided with an identification code, the system further comprising:
    an ID code reading device operable to read the identification code provided on a received recording medium; and
    an ID code writing device operable to write the read identification code on a printed sheet having pictures recorded on the recording medium.

15. An image processing system comprising:
    reception portion for receiving a plurality of roll films sequentially, each roll film carrying a plurality of pictures;
    a reader operable to read the plurality of pictures recorded on each roll film;
    a memory operable to store the read pictures;
    a printer operable to print the read pictures on a sheet;
    a controller operable to control the printer to print all the picture recorded each roll film on a single sheet; and
    a film discharger operable to discharge each roll film after placing it in a cartridge case.

16. An image processing system as defined in claim 15, further comprising:

a storing unit including a plurality of containers for containing discharged cartridge cases each holding a roll film and printed sheets, the cartridge case holding a roll film and the printed sheet bearing the pictures of the roll film being stored in the same container.

17. An image processing system as defined in claim 15, further comprising:

a first ID code writing device operable to write an identification code on a cartridge holding a roll film; and a second ID code writing device operable to write the same identification code on a printed sheet having pictures recorded on the roll film hold by the cartridge case.

* * * * *

UNITED STATES PATENT AND TRADEMARK OFFICE
CERTIFICATE OF CORRECTION

PATENT NO. : 5,576,836
DATED : November 19, 1996
INVENTOR(S) : Homare SANO et al It is certified that error appears in the above-indentified patent and that said Letters Patent is hereby corrected as shown below:

Column 11, line 6, after "and", insert --a--.

Column 11, line 8, after "defined", insert --in--.

Column 11, line 22, after "defined", insert --in--.

Column 12, line 4, before "second", insert --a--.

Column 12, line 56, before "reception", insert --a--.

Signed and Sealed this

Ninth Day of December, 1997

BRUCE LEHMAN

*Attest:*

*Attesting Officer*          Commissioner of Patents and Trademarks